(12) United States Patent
Ollila (10) Patent No.: US 10,274,169 B2
(45) Date of Patent: *Apr. 30, 2019

(54) MEMS LED ZOOM

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,381

(22) Filed: Nov. 10, 2017

(65) Prior Publication Data

US 2018/0163948 A1    Jun. 14, 2018

Related U.S. Application Data

(63) Continuation of application No. 14/863,944, filed on Sep. 24, 2015, now Pat. No. 9,816,687.

(51) Int. Cl.
| | | |
|---|---|---|
| *F21V 14/00* | (2018.01) | |
| *F21V 17/10* | (2006.01) | |
| *G03B 15/05* | (2006.01) | |
| *F21V 5/04* | (2006.01) | |
| *F21Y 115/10* | (2016.01) | |

(52) U.S. Cl.
CPC ............ *F21V 14/003* (2013.01); *F21V 5/045* (2013.01); *F21V 17/101* (2013.01); *G03B 15/05* (2013.01); *F21Y 2115/10* (2016.08); *G03B 2215/051* (2013.01); *G03B 2215/0567* (2013.01); *G03B 2215/0592* (2013.01)

(58) Field of Classification Search
CPC .... F21V 17/101; F21V 19/001; F21V 19/003; F21V 19/0035; F21V 19/004; F21V 19/005; F21V 14/003; F21V 13/00; F21V 13/02; G02B 3/0031; G02B 7/021; G02B 7/025; G02B 19/0061; H01L 33/58
See application file for complete search history.

(56) References Cited

U.S. PATENT DOCUMENTS

| | | |
|---|---|---|
| 4,419,614 A | 12/1983 | Kimura |
| 4,730,894 A | 3/1988 | McKechnie et al. |

(Continued)

FOREIGN PATENT DOCUMENTS

| | | |
|---|---|---|
| JP | 2000057602 A | 2/2000 |
| JP | 2011141910 A | 7/2011 |

(Continued)

OTHER PUBLICATIONS

PCT International Search Report, PCT No. PCT/US2016/044525, dated Oct. 12, 2016, 3 pages.

(Continued)

*Primary Examiner* — Scott B Geyer
(74) *Attorney, Agent, or Firm* — International IP Law Group, P.L.L.C.

(57) ABSTRACT

The present techniques are related to an apparatus for an MEMS LED zoom. The apparatus for includes an LED light source and a collimation lens. The collimation lens to collimate light from the LED light source. The apparatus is also to include an active lens. The active lens to adjust the collimated light from the collimation lens.

18 Claims, 9 Drawing Sheets

(56) References Cited

U.S. PATENT DOCUMENTS

| | | | |
|---|---|---|---|
| 6,285,476 B1 * | 9/2001 | Carlson | H04B 10/1125 398/9 |
| 6,987,613 B2 | 1/2006 | Pocius et al. | |
| 7,387,695 B2 | 6/2008 | Iwakawa et al. | |
| 7,773,489 B2 | 8/2010 | Murata et al. | |
| 7,896,524 B2 | 3/2011 | Yoneda et al. | |
| 8,748,921 B2 | 6/2014 | Martin et al. | |
| 9,645,472 B2 | 5/2017 | Ollila | |
| 9,746,689 B2 | 8/2017 | Ollila | |
| 9,749,536 B2 | 8/2017 | Ollila | |
| 9,816,687 B2 * | 11/2017 | Ollila | F21V 14/003 |
| 2002/0196720 A1 | 12/2002 | Takeshita | |
| 2004/0174614 A1 | 9/2004 | Hovanky | |
| 2005/0201109 A1 | 9/2005 | Shimura | |
| 2006/0077867 A1 | 4/2006 | Suprun | |
| 2011/0122495 A1 | 5/2011 | Togashi | |
| 2011/0267570 A1 * | 11/2011 | Saito | G02B 3/08 349/139 |
| 2012/0314143 A1 * | 12/2012 | Shin | B32B 37/02 349/15 |
| 2014/0022645 A1 | 1/2014 | Matsuura et al. | |
| 2014/0231846 A1 | 8/2014 | Lin | |
| 2014/0239336 A1 | 8/2014 | Steppel et al. | |
| 2016/0230953 A1 * | 8/2016 | Wang | F21V 5/04 |

FOREIGN PATENT DOCUMENTS

| | | |
|---|---|---|
| JP | 2011233315 A | 11/2011 |
| JP | 2014232716 A | 12/2014 |
| KR | 20000020036 A | 4/2000 |
| KR | 20090047236 | 5/2009 |
| WO | 3024062 | 4/2000 |
| WO | 2015101899 A1 | 7/2015 |

OTHER PUBLICATIONS

PCT International Search Report, PCT No. PCT/US2016/044522, dated Nov. 4, 2016, 3 pages.

Supplementary European Search Report for Related EP Application 16-84-9172 with a date of Completion of Feb. 18, 2019. 3 pages.

* cited by examiner

MEMS LED ZOOM

CROSS REFERENCE TO RELATED APPLICATION

The present application claims the benefit of the filing date of U.S. patent application Ser. No. 14/863,944, by Mikko Ollila, entitled "MEMS LED ZOOM," filed Sep. 24, 2015, and which is incorporated herein by reference.

FIELD

The present techniques generally relate to lighting during photographic image capture. More specifically, the present techniques relate to a flash structure that is easily customized and low cost.

BACKGROUND

Electronic devices with generally include personal computers, tablets, smart phones, laptops, and the like. Frequently, these devices include an image capture device coupled with an illuminator. The image capture device can be used to obtain still-shots or video of a subject, and the illuminator can output light to ensure a well-lit video or image capture.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Electronic devices such as video cameras, still cameras, personal computers, tablets, smart phones, laptops, and the like may include an image capture device coupled with an illuminator. As used herein, an image capture device may be a camera, and the illuminator may be referred to as a flash. Moreover, the term camera may refer to a video recorder or a still picture camera. During image capture, the illuminator may provide a flash of light to illuminate the subject of the image capture.

Embodiments described herein generally provide a structure to illuminate subjects at various distances. In particular, the structure is at a low height for implementation in small form factors. Moreover, the structure is low cost, modular, and can be easily customized for any new light sources, such as LED lights. Thus, the structure can enable zoom of light from the flash according to the subject of the image capture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 1:
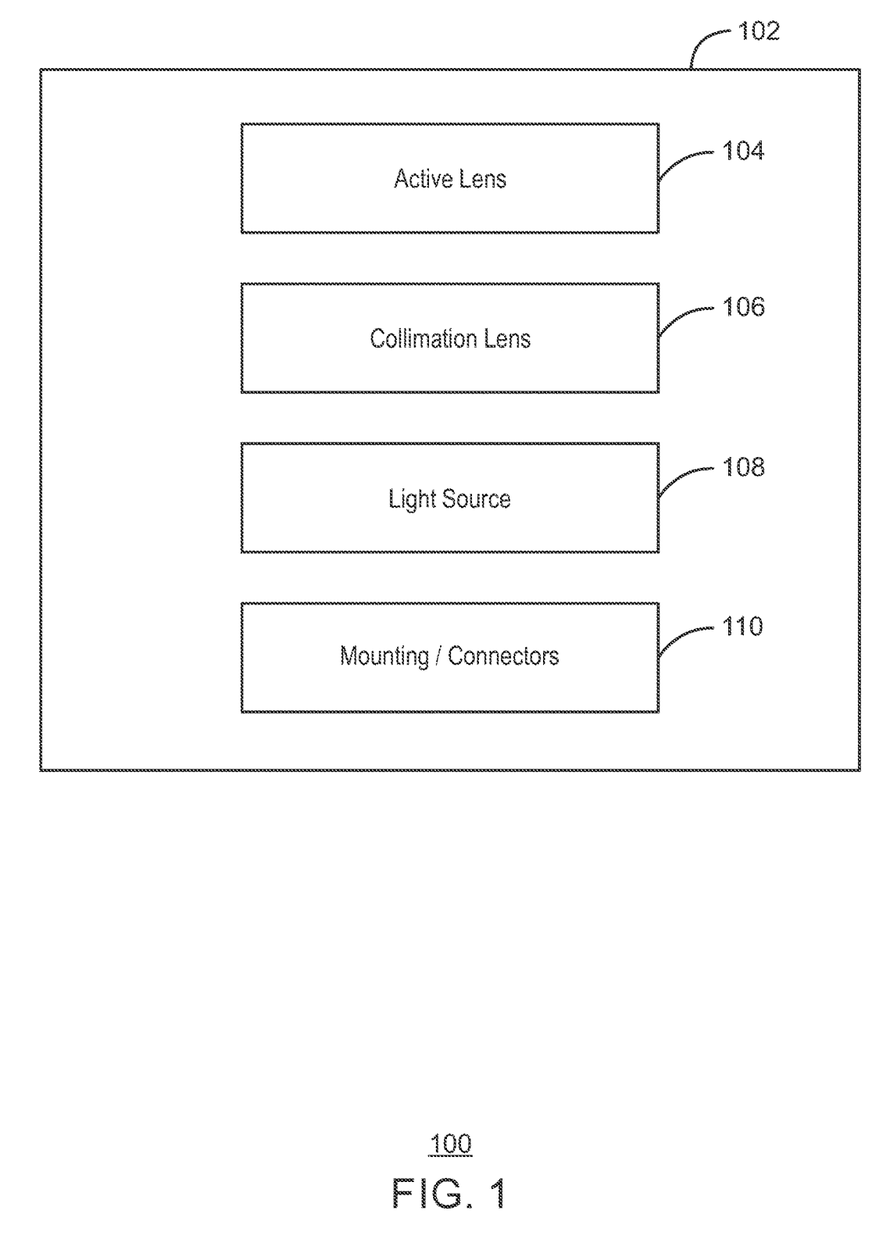
FIG. 1 is a block diagram of a flash zoom structure.

FIG. 1 is a block diagram of a flash zoom structure 100. The flash zoom structure 100 includes non-moving, adaptive parts that are used to enable a zoom function. As used herein, the zoom function refers to focusing or diverging light from a light source based on an area of view. The area of view is determined by an associated image capture device, which can adjust an area of view based on user preferences or the subject of the image capture device. The structure 100 can be manufactured with ease, is reusable with various light sources, and is low cost.

The housing 102 can be integrated into a printed circuit board (PCB) of a computing device via a socket, lead, or module/glue. In addition, the housing may be soldered onto the PCB of a computing device. In embodiments, the housing is a molded interconnect device (MID), including an injection-molded thermoplastic part with integrated electronic circuit traces. The MID housing enables various electromechanical components to be combined into a single device. In particular, the MID housing may be combined with circuit boards, connectors, and cables to create a single part with functionality described herein. The MID housing can be constructed via laser direct structuring (LDS). The LDS process includes injection molding, laser activation, and metallization.

The housing 102 includes an active lens 104. The active lens is to include electrical conductors to enable a zoom functionality. In embodiments, the active lens is to enable the adjusting, alternating, or tuning of the light passed through the lens through via the application of electricity to circuitry of the active lens. In embodiments, the active lens is a microelectromechanical (MEMS) lens or a liquid crystal (LC) lens. The active lens 104 is spatially fixed and enables various flash configurations without movement of the active lens 104.

The housing 102 also includes a collimation lens 106. The collimation lens 106 is to collimate or partially collimate light from a light source 108. In embodiments, the collimation lens 106 is a Fresnel lens. Additionally, in embodiments, the Fresnel lens is manufactured by injection molding or it is a foil type of replicated type of plastic. The collimation lens may be laminated onto the supporting glass, and then bonded onto the glass via an optically clear adhesive (OCA). The light source 108 may be any light source, such as a light emitting diode (LED). In embodiments, the collimation lens 106 converges light from the light source 108, and the active lens 104 focuses or diverges the collimated light from the collimation lens 106, as necessary based on the location of the image capture subject and the ambient light in the environment of the image capture subject. In embodiments, the collimation lens can be designed to enable a large zoom factor, such that the active lens, when activated, is to diverge the beam of light. In the opposite scenario, the smallest zoom factor is a zoom factor of 1×, which is a full FOV where the active lens is to focus the light.

In embodiments, the active lens 104 is a non-moving adaptive lens that is to direct the flash light at various angles, and is not limited to focusing or diverging the collimated light. Additionally, when the light is zoomed to a field of view (FOV) three times smaller than a first FOV, the intensity of light increases by at least a square of the zoom ratio of the LED zoom increase. For example, increasing an LED zoom ratio by three times results in an increase of the flash intensity on the subject by nine times. In this case, a single light source can produces as much as light eight additional light sources add centered into the zoomed area of view. As used herein, the zoom ratio is the full FOV compared to the new FOV. The present techniques enable the delivery of focused light on an image in a FOV by at a higher zoom factor, with the light at a higher intensity that is a square of the zoom factor. Moreover, the present techniques increase the range of the resultant light beam. In some cases, the LED zoom ratio may correspond to what is digitally or optically zoomed in a FOV of the camera. While, such a zoom ration is not required, light is only needed on FOV which is captured or viewed. For a full FOV, the LED zoom can enable lighting modes that can change the lighting throughout a FOV. For example, one lighting mode may include a very high uniformity center versus the corner of image. Another lighting mode may include a lighting mode with a low lighting uniformity throughout the image.

The housing 102 also includes mounting/connectors 110. The mounting/connectors 110 enables the housing and all components within the structure 100 to be communicatively coupled with a printed circuit board (PCB) of a computing device. The mounting/connectors 110 may be leads that enable an SMD connection. The mounting/connectors 110 may also be pads that enable a socket connection. In embodiments, the mounting/connectors 110 are integrated into the housing 102. The structure 100 can be surface mount technology (SMT) mounted or connected manually to a socket or a connector of a computing device.

Figure 2A:
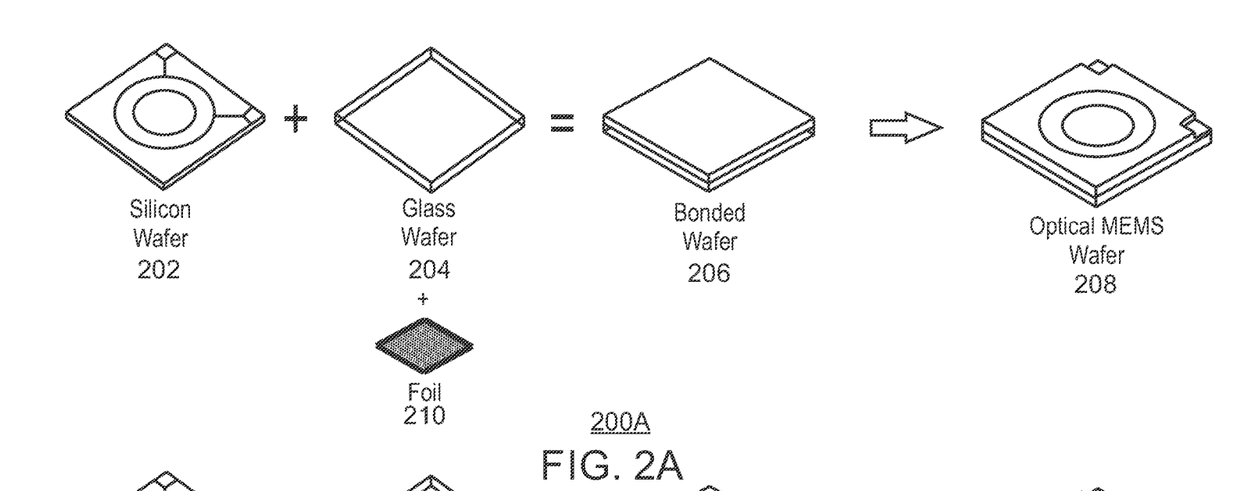
FIG. 2A is an illustration of lens manufacture.

FIG. 2A is an illustration of lens manufacture. There are several types of active lens technologies that can be manufactured as wafers or panels. For example, liquid crystal (LC) lenses or a wafer level MEMS liquid lens can each be manufactured as wafers. The resultant lens may be an active lens that changes shape, or the liquid crystal molecules orientation changes in response to varying an electrical field, which results in varying light refraction. The manufacturing process described herein is for ease of description and the present techniques should not be limited to the processes described herein.

In embodiments, a silicon wafer 202 is developed via MEMS processing. The silicon wafer 202 may include the electronic circuitry necessary to function as an active lens. The active lens can be realized by etching the silicon wafer, and including piezo rings on the silicon wafer. The rings may be made of polyurethane (PU) and applied on top of the substrate (the silicon wafer) to serve as a hinge and as a spring that compensates the volume displacement of a glass wafer 204 upon actuation of the lens. The glass wafer 204 is used to support the silicon wafer 202. The silicon wafer and glass wafer 204 may be bonded via an anodic bonding process. In this manner, the microelectronics present on the silicon wafer 202 can be encapsulated within a fluid, such as an oil. The oil may be located within a flexible membrane. When the MEMS is actuated, it may press the membrane-oil packet such that the curvature of membrane changes. In this manner, the membrane forms a lens with changing curvature leading to light bending. In embodiments, instead of an optical oil, a soft polymer lens is actuated by piezo ring, and piezo ring is a MEMS device. In such an embodiment, the polymer lens changes it shape and refracts differently according to the change in shape. The glass wafer 204 includes a collimation lens made from replication or printing and delivered in foil form to be laminated onto the glass wafer. Thus, a foil 210 can be replicated, printed or molded directly onto the supporting substrate, such as the glass wafer 204. The wafers are bonded 206, and result in an optical MEMS wafer 208.

Figure 2B:
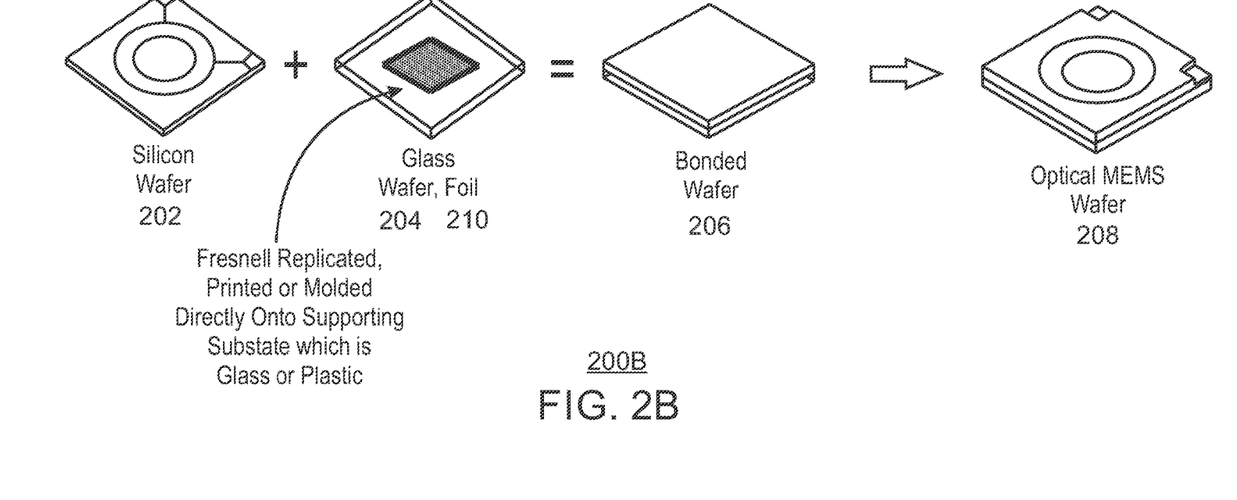
FIG. 2B is an illustration of lens manufacture where a collimation lens is replicated directly onto the glass wafer.
Figure 6:
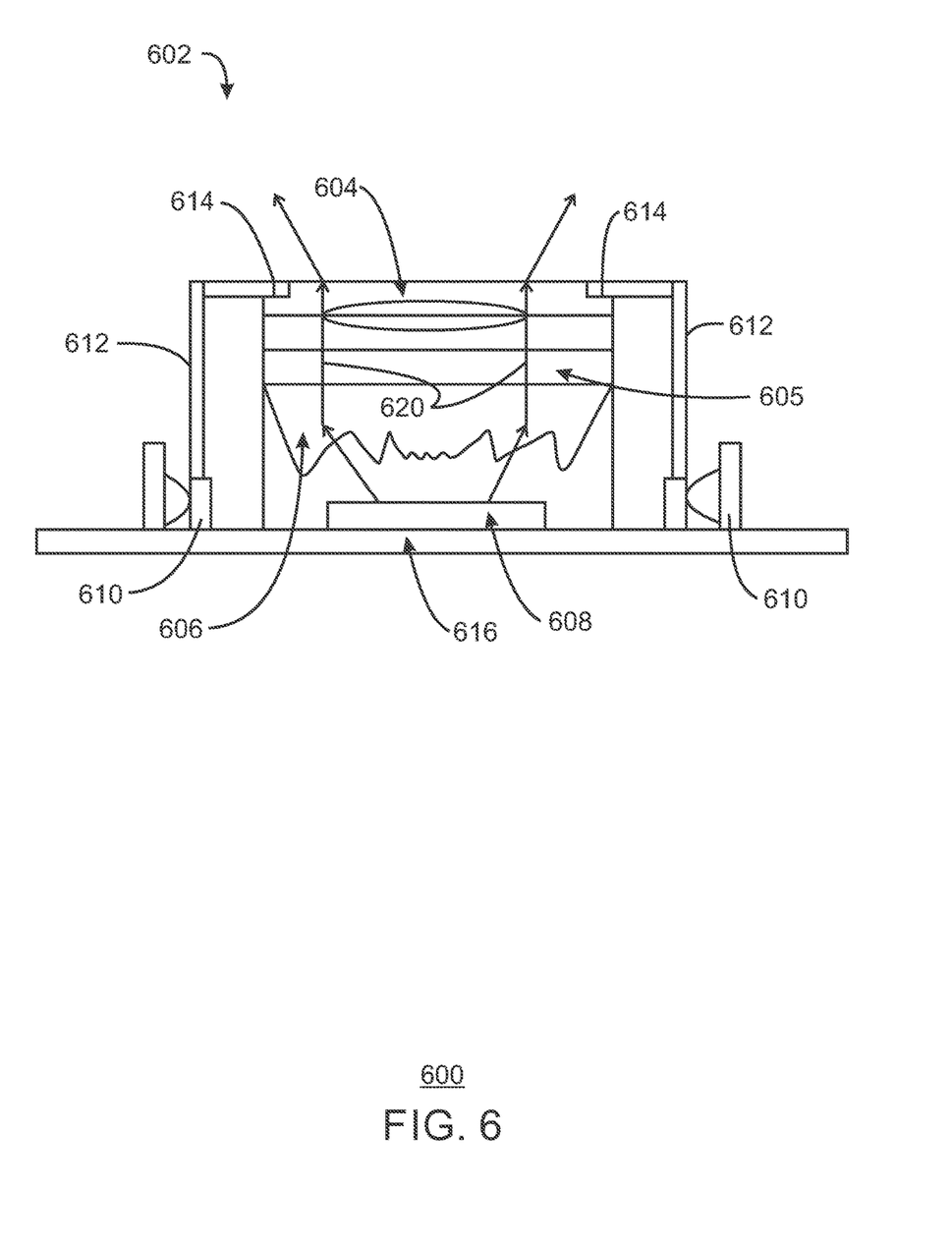
FIG. 6 illustrates a socketable LED zoom structure.

FIG. 2B is an illustration of lens manufacture where a collimation lens is replicated directly onto the glass wafer. In embodiments, the foil containing the Fresnel lens and the wafer having the active lenses are laminated or bonded together and afterward singulated resulting a unique volume production process. In some cases, the wafer may be a liquid crystal panel. Additionally, singulation refers to a process of sawing or dicing of single lens from of panel or wafer that includes a plurality of lenses. After singulation, the bonded lenses can be added to a housing. The bonded wafers 206 include a membrane that forms the lens surface and a fluid that serves as a refracting medium is combined with the glass wafer 204. The bonded wafers 206 create an MEMS active lens based on liquid inside of a flexible membrane. In embodiments, this is achieved via optical oil encapsulation. The collimation lens is replicated, printed or injection molded directly onto the supporting substrate. Although the supporting substrate is illustrated as a glass wafer, the supporting substrate can be made of glass, plastic wafer, or be a panel. Additionally, as noted above, the active lens may be a liquid crystal or MEMS active lens. In embodiments, the replicated collimation lens is made of a foil type or a replicated plastic and is laminated on the active lens. Alternatively, the collimation lens is injection molded and separately assembled in the housing, as illustrated in FIG. 6. Accordingly, the optical MEMS wafers 208 include an active, adaptive lens via the MEMS manufacturing process as well as a collimation lens replicated onto the glass wafer of the bonded wafers.

Figure 2C:
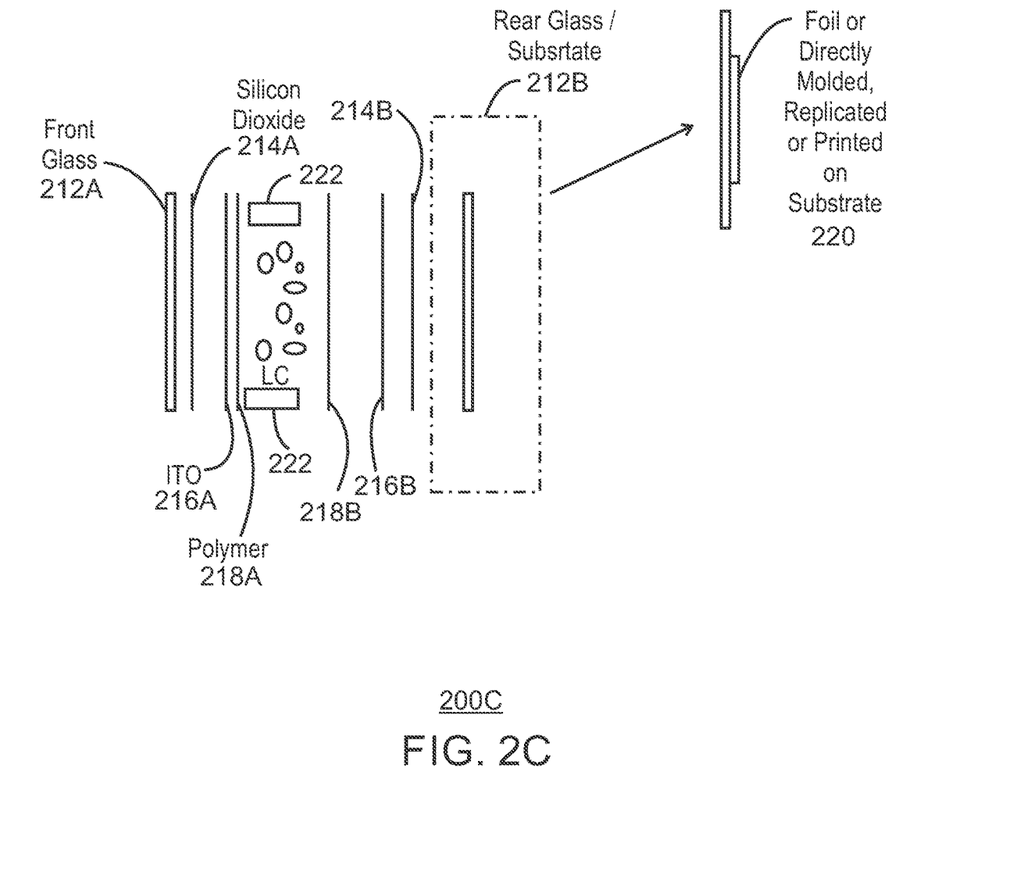
FIG. 2C is an illustration of a bonded lens.

FIG. 2C is an illustration of a bonded lens 200C. In the example of FIG. 2C, the bonded lens is a liquid crystal active lens. The bonded wafer 200C includes a front substrate 212A. The substrate 212A may be a front glass or plastic substrate. The bonded lens also includes a rear substrate 212B, which may be a rear glass or plastic substrate. Thus, the liquid crystal is sandwiched between the two supporting substrates 212A and 212B.

In the case where the two supporting substrates 212A and 212B are glass, each glass substrate may be coated with silicon dioxide 214A and 214B. In embodiments, the silicon dioxide is to improve liquid crystal alignment. Transparent electrode patterns may be made by applying a layer of indium tin oxide (ITO) to the each glass substrate. Accordingly, an ITO layer 216A and an ITO layer 216B are illustrated at the front substrate 216A and the rear substrate 216B, respectively. In embodiments, a photolithography or silkscreening process may be used to produce the transparent electrode pattern. The ITO layer functions as electrical signals to control the orientation of liquid crystal molecules. A layer of long chain polymer is applied to each substrate. Thus, polymer 218A is applied to front substrate 212A and polymer 218B is applied to front substrate 212B. The polymer further enables proper alignment of the liquid crystals 220 to align properly, followed by a sealing resin. The spacers 222 next are put into place, and the glass sandwich is filled with the liquid crystal 220 material. The rear substrate 210B may include foil that is directly molded, replicated, laminated, or printed onto the substrate, as illustrated by the rear substrate 220.

Figure 3:
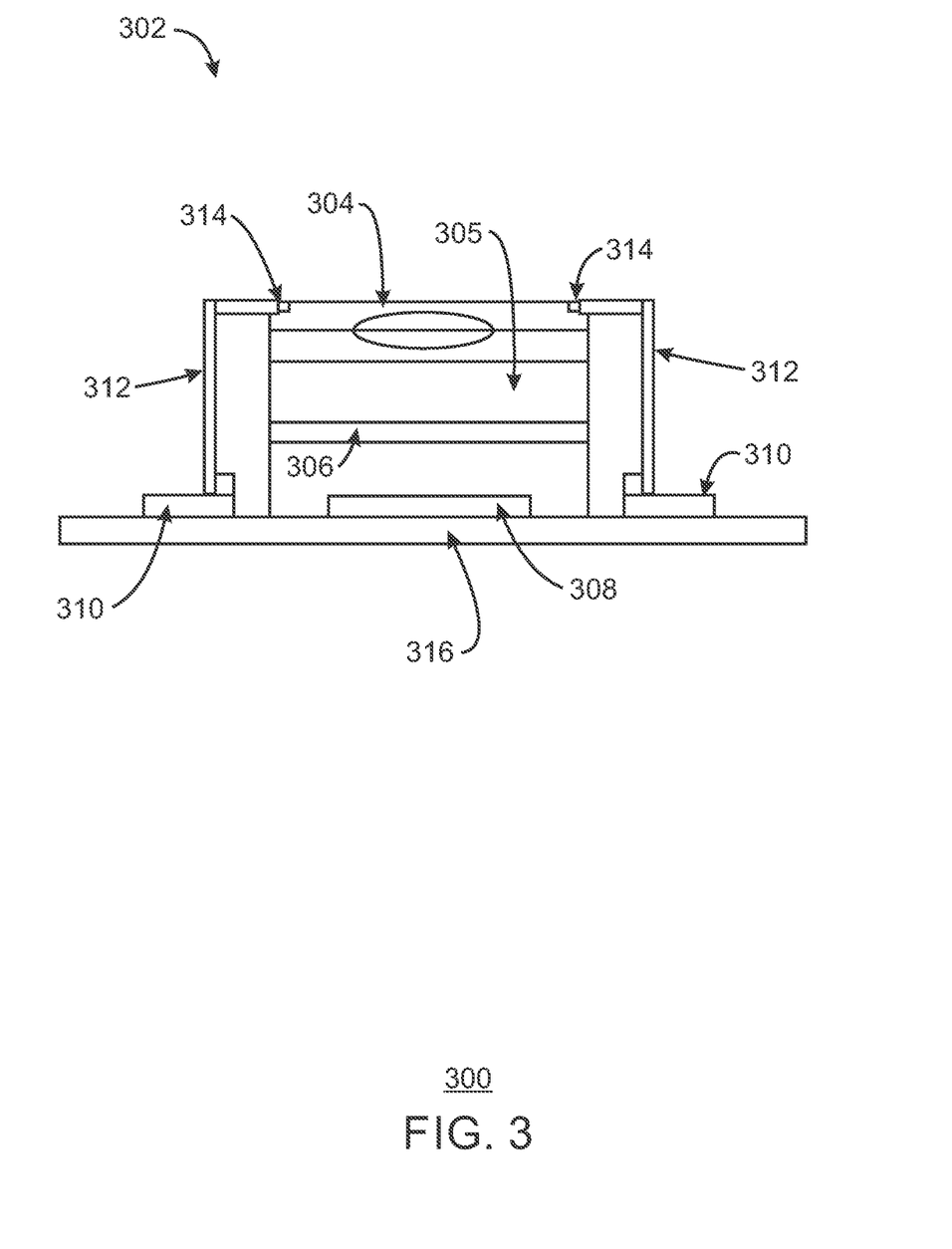
FIG. 3 illustrates an LED zoom structure with SMT leads.

FIG. 3 illustrates an LED zoom structure 300 with surface mount technology (SMT) leads The surface mount device (SMD) structure includes a housing 302, active lens 304, Fresnel lens 306, LED 308, and injection molded leads 310. The Fresnel lens 306 is a replication type Fresnel lens with a lower profile when compared with an injection molded Fresnel lens. The Fresnel lens 306 is directly molded, replicated, laminated, or printed onto a substrate 305. The substrate 305 may be a glass or plastic wafer that is a supporting substrate of the active lens. The housing 302 may include conductors 312 that are coupled with terminals 314 of the active lens 304. The active lens 304 may be electrically coupled with a printed circuit board (PCB) 316 of a computing device via injection molded leads 310.

Figure 4:
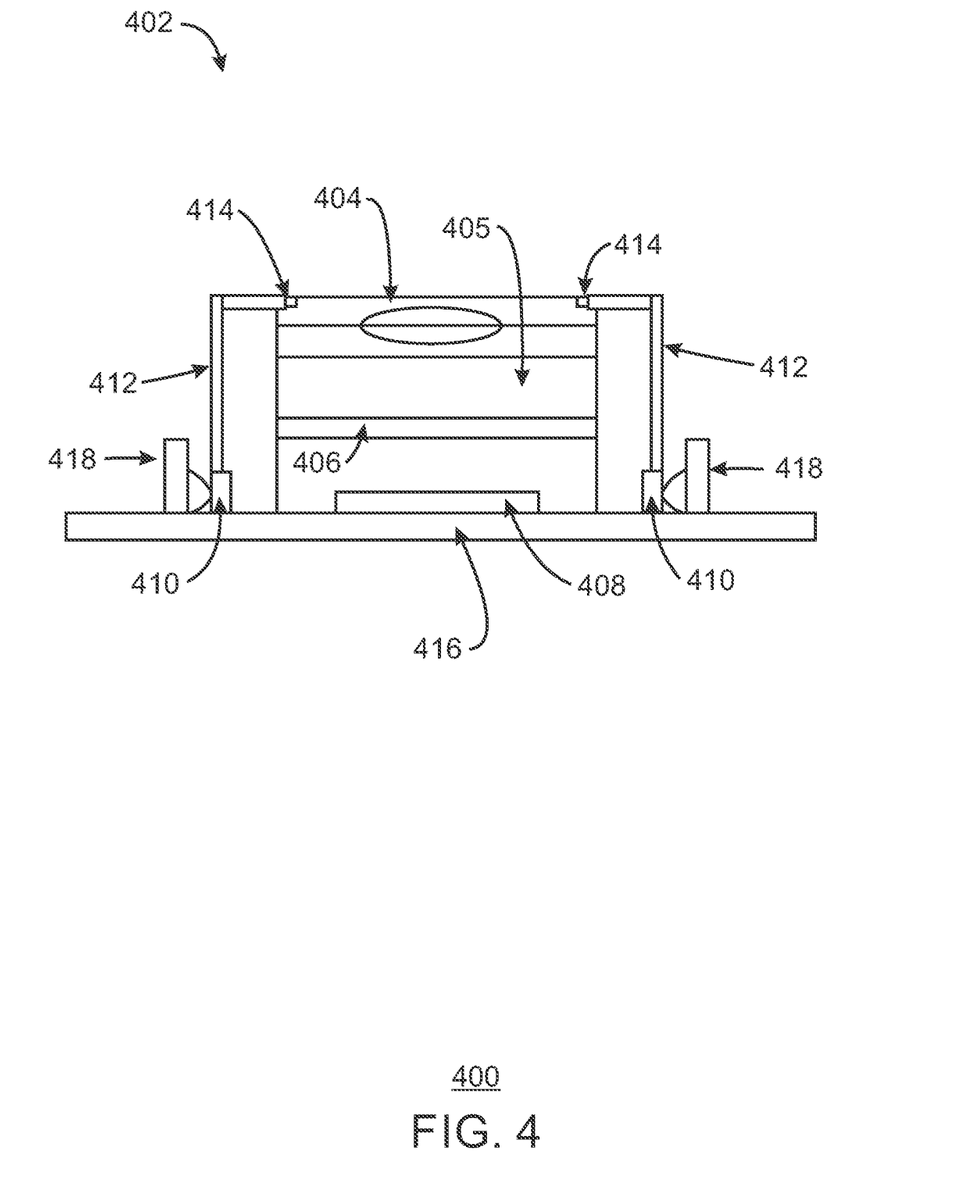
FIG. 4 illustrates a socketable LED zoom structure.

FIG. 4 illustrates a socketable LED zoom structure 400. The structure 400 is a socket structure, including a housing 402, active lens 404, Fresnel lens 406, LED 408, and injection molded leads 410. The Fresnel lens 406 is directly molded, replicated, laminated, or printed onto a substrate 405. The substrate 405 may be a glass or plastic wafer that is a supporting substrate of the active lens. The housing 402 may include conductors 412 that are coupled with terminals 414 of the active lens 404. The active lens 404 may be electrically coupled with a printed circuit board (PCB) 416 of a computing device via injection molded leads 410. The PCB 416 is coupled with a pair of socket and spring 418. The socket and springs 418 enable the housing 402, which includes the active lens 404, glass wafer 405, Fresnel lens 406, LED 408, injection molded leads 410, conductors 412, and terminals 414, to be manually placed upon the PCB 416.

Figure 5:
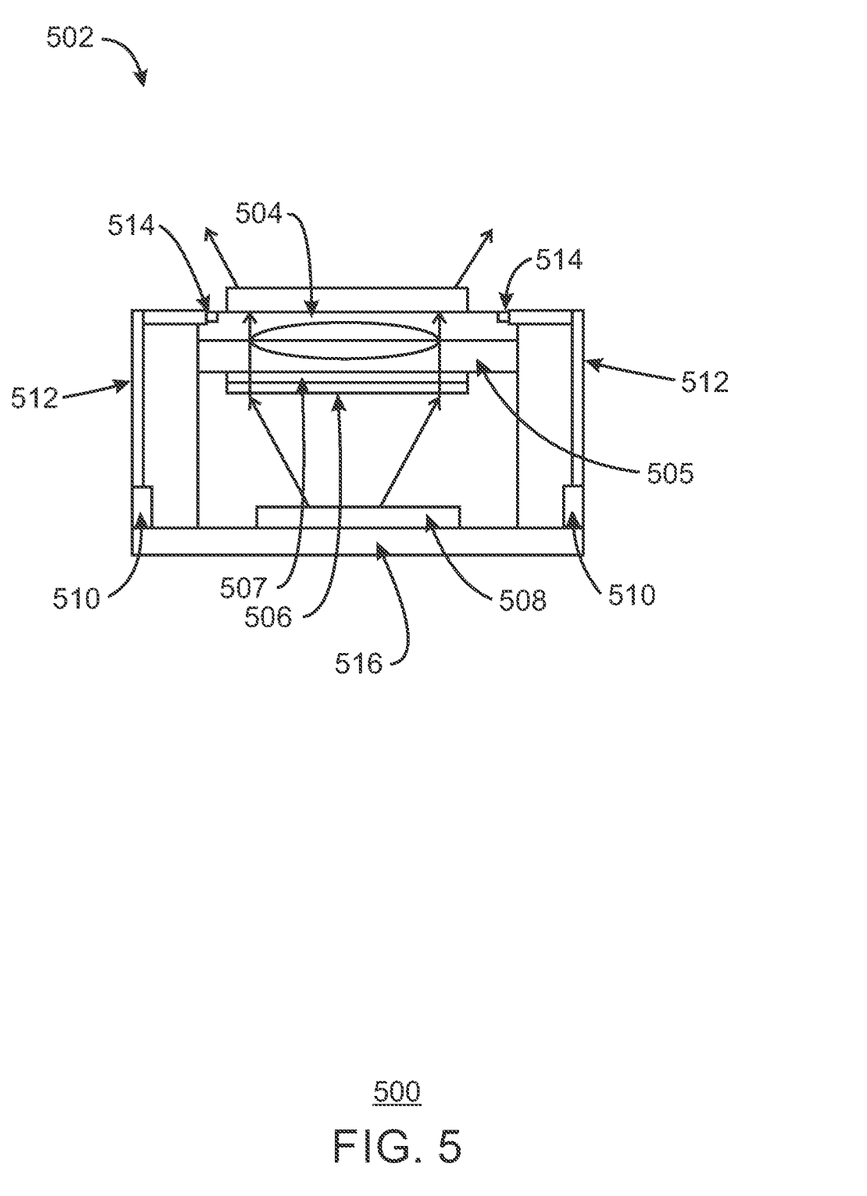
FIG. 5 illustrates an LED zoom module and structure with a replicated type of Fresnel lens.

FIG. 5 illustrates an LED zoom module 500. The structure 500 is a module, including a housing 502, active lens 504, Fresnel lens 506, LED 508, conductive glue 510, and a PCB 516 glued to the housing 502. As illustrated in FIG. 5, the Fresnel lens 506 is directly molded, replicated, laminated, or printed onto a substrate 505. The substrate 505 may be a glass or plastic wafer that is a supporting substrate of the active lens. In embodiments, the Fresnel lens is laminated onto the supporting glass, and then bonded onto the glass via an optically clear adhesive (OCA) 507. In embodiments, the Fresnel lens 506 may be formed from a large foil roll that includes a plurality of replicated Fresnel lenses. The foil lenses have features with dimensions in the range of 10 um, compared to an injection molded lens that has lenses with features in the range of 0.1-1 mm.

The foil type of lens may be bonded with OCA or laminated on supporting glass of MEMS or LC. This bonded structure is connected to MID housing, which can then be mounted to a printed circuit board (PCB) or printed wired board (PWB) in socket, module, or leaded form. In embodiments, the LED module enables the active lens controller to be on PWB, and control signals to the module are located externally to the module. The housing 502 may include conductors 512 that are coupled with terminals 514 of the active lens 504. The active lens 504 may be electrically coupled with a printed circuit board (PCB) 516 of a computing device via injection molded leads 510. The PCB 516 is coupled with a pair of socket and springs 518. The socket and springs 518 enable the housing 502, which includes the active lens 504, glass wafer 505, Fresnel lens 506, LED 508, injection molded leads 510, conductors 512, and terminals 514, to be manually placed upon the PCB 516. Light from a light source is dispersed through the active lens 504, Fresnel lens 506, and out of the housing 502 as illustrated by arrows emanating from the LED 508.

As illustrated by FIGS. 3-5, the collimation or Fresnel lens can be directly molded, replicated, laminated, or printed onto a substrate, while the LED structure is a socketed, SMD, lead-based, or a module structure. The replicated collimation lens can be delivered as a large roll containing several lenses, or it can be laminated on active lens wafer or panel and then singulated for one piece of active lens-Fresnel-pair part. Additionally, the active lens can be configured so that it is either focusing or diverging light from the Fresnel lens and light source.

FIG. 6 illustrates a socketable LED zoom structure 600. The structure 600 is a socket structure, including a housing 602, active lens 604, Fresnel lens 606, LED 608, and injection molded leads 610. The Fresnel lens 606 is injection molded and separately assembled in housing 602. The substrate 605 may be a glass or plastic wafer that is a supporting substrate of the active lens. The housing 602 may include conductors 612 that are coupled with terminals 614 of the active lens 604. The active lens 604 may be electrically coupled with a printed circuit board (PCB) 616 of a computing device via injection molded leads 610. The PCB 616 is coupled with a pair of socket and spring 618. The socket and springs 618 enable the housing 602, which includes the active lens 604, glass wafer 605, Fresnel lens 606, LED 608, injection molded leads 610, conductors 612, and terminals 614, to be manually placed upon the PCB 616. Light from a light source is dispersed through the active lens 604, Fresnel lens 606, and out of the housing 602 as illustrated by arrows emanating from the LED 608.

Figure 7:
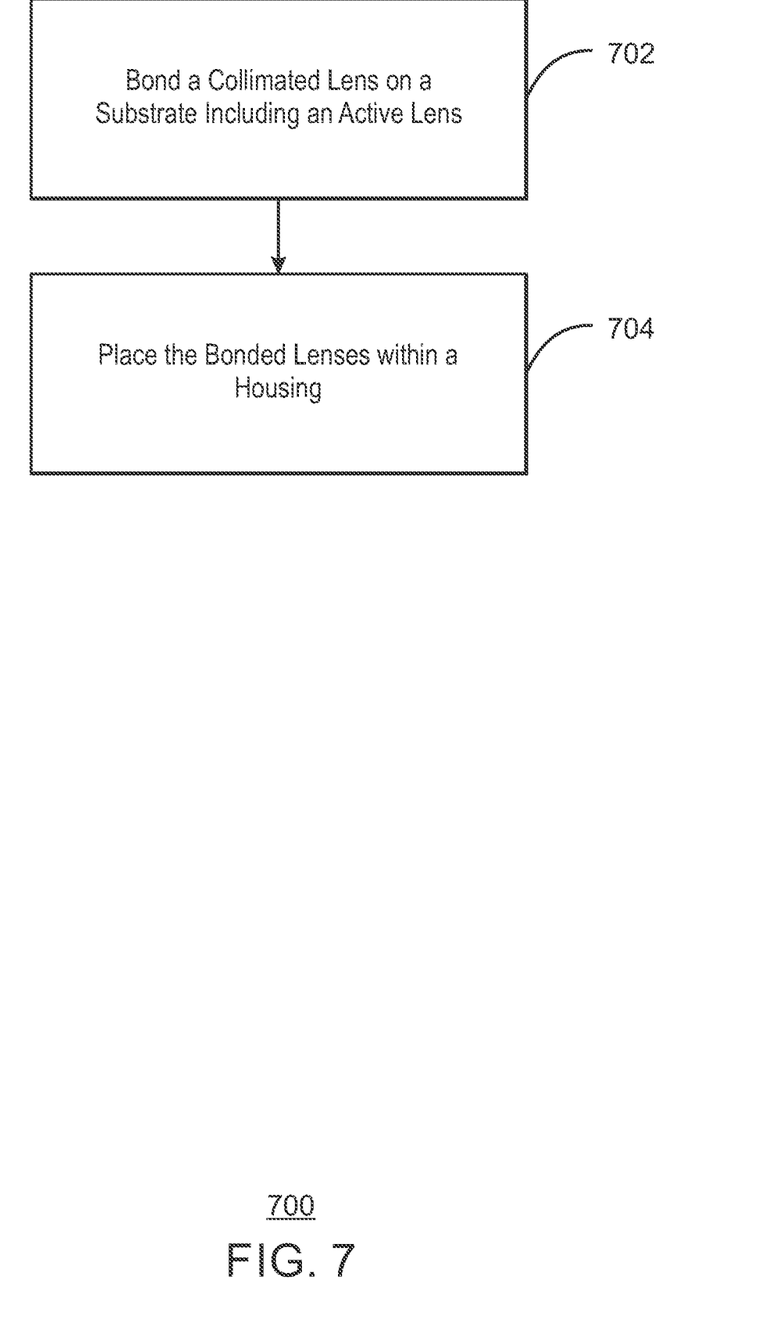
FIG. 7 is a process flow diagram of implementing a MEMS LED zoom.

FIG. 7 is a process flow diagram of implementing a MEMS LED zoom. At block 702, a collimated lens is bonded onto a substrate including an active lens. In embodiments, the collimated lens is a Fresnel lens. At block 704, the bonded collimated lens and active lens are placed in a housing. In embodiments, the housing can be coupled with a circuit board via an SMT, socket, or module type configuration.

Figure 8:
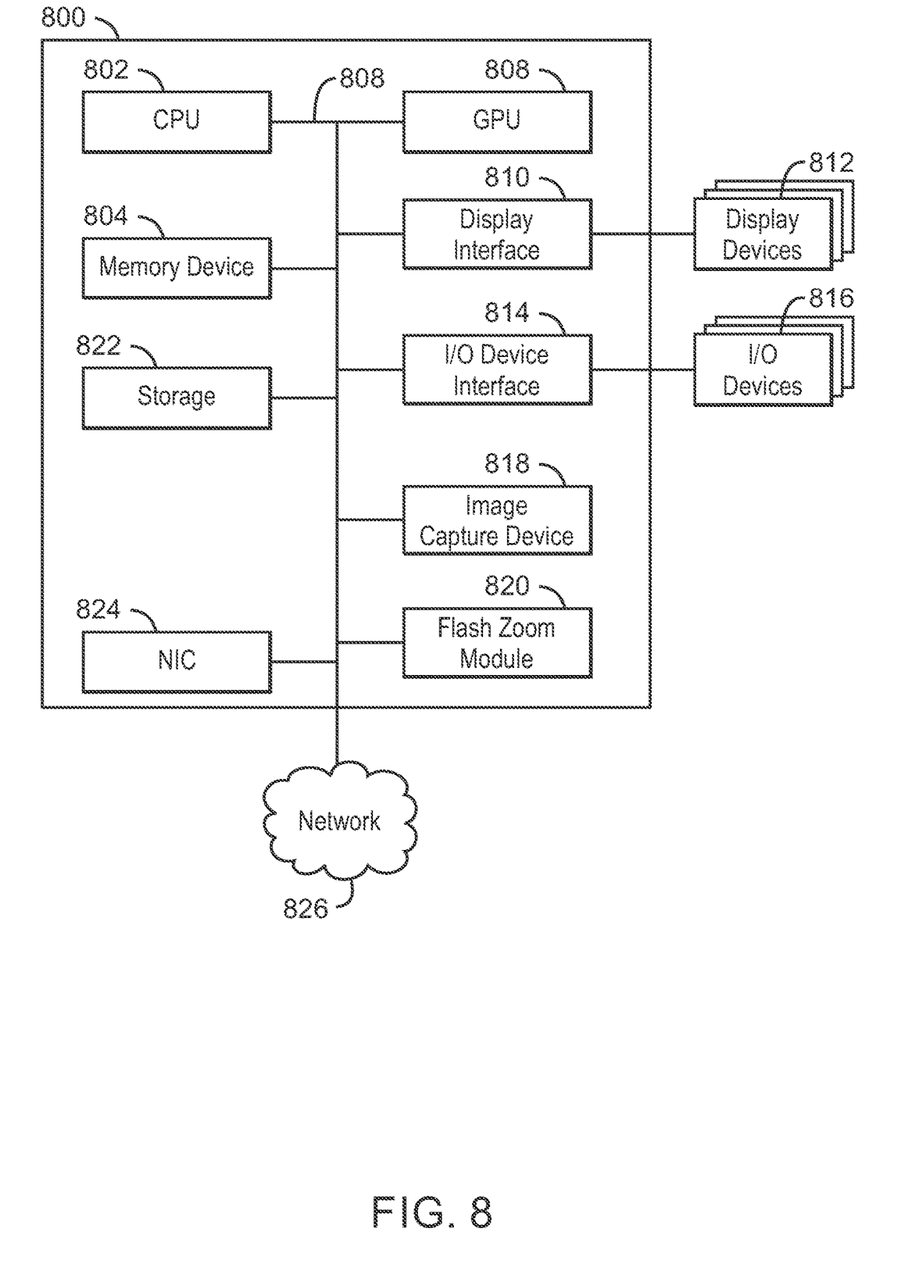
FIG. 8 is a block diagram of a computing device that includes a MEMS LED zoom structure.

FIG. 8 is a block diagram of a computing device 800 that includes a MEMS LED zoom structure. The computing device 800 can be, for example, a laptop computer, desktop computer, tablet computer, mobile device, or server, among others. In particular, the computing device 800 can be a mobile device such as a cellular phone, a smartphone, a personal digital assistant (PDA), phablet, or a tablet. The computing device 800 can include a central processing unit (CPU) 802 that is configured to execute stored instructions, as well as a memory device 804 that stores instructions that are executable by the CPU 802. The CPU can be coupled to the memory device 804 by a bus 806. Additionally, the CPU 802 can be a single core processor, a multi-core processor, a computing cluster, or any number of other configurations. Furthermore, the computing device 800 can include more than one CPU 802. The memory device 804 can include random access memory (RAM), read only memory (ROM), flash memory, or any other suitable memory systems. For example, the memory device 804 can include dynamic random access memory (DRAM).

The computing device 800 can also include a graphics processing unit (GPU) 808. As shown, the CPU 802 can be coupled through the bus 806 to the GPU 808. The GPU 808 can be configured to perform any number of graphics operations within the computing device 800. For example, the GPU 808 can be configured to render or manipulate graphics images, graphics frames, videos, or the like, to be displayed to a user of the computing device 800. In some embodiments, the GPU 808 includes a number of graphics engines, wherein each graphics engine is configured to perform specific graphics tasks, or to execute specific types of workloads.

The CPU 802 can be linked through the bus 806 to a display interface 810 configured to connect the computing device 800 to a display device 812. The display device 812 can include a display screen that is a built-in component of the computing device 800. The display device 812 can also include a computer monitor, television, or projector, among others, that is externally connected to the computing device 800.

The CPU 802 can also be connected through the bus 806 to an input/output (I/O) device interface 814 configured to connect the computing device 800 to one or more I/O devices 816. The I/O devices 816 can include, for example, a keyboard and a pointing device, wherein the pointing device can include a touchpad or a touchscreen, among others. The I/O devices 816 can be built-in components of the computing device 800, or can be devices that are externally connected to the computing device 800.

The computing device also includes an image capture device 818. The image capture device 118 may be a still shot camera, 3D camera, video recording device, and the like. In embodiments, the computing device 800 also includes an infrared device to support the 3D camera. The image capture device 818 is coupled with a flash zoom module 820. The flash module may be an SMT connected device, Socket connected device, or an LED module.

The computing device also includes a storage device 822. The storage device 822 is a physical memory such as a hard drive, a solid state drive, an optical drive, a thumbdrive, an array of drives, or any combinations thereof. The storage device 822 can also include remote storage drives such as used for cloud computing applications. The storage device 822 includes any number of applications that are configured to run on the computing device 800.

The computing device 800 can also include a network interface controller (NIC) 824. The NIC 824 can be configured to connect the computing device 800 through the bus 806 to a network 826. The network 826 can be a wide area network (WAN), local area network (LAN), or the Internet, among others.

The present techniques enable a flash zoom module with non-moving adaptive optics part that provide a zoom function. The active, adaptive lens can be such that it either focuses or diverges the light from a collimated lens. The components for adaptive optics, collimated lens, and conductors may be a built in housing to control the active lens. Within the housing, a Fresnel lens may be the collimated lens that collimates the light from a light source, such as an LED light source. In embodiments, the housing is solderable, a full module, or socketable. The Fresnel lens can be made by replication or printing, wherein the purpose of Fresnel lens is to collimate light from the LED. In embodiments, the manufacturing process is such that foil and panels are bonded together and then singulated. The replication part of the manufacturing process may vary, along with the type of light source. This results in a very modular structure that is reusable and can be used with a high manufacturing volume concept.

The non-moving, active lens is assembled on a holder portion of the housing that include electrical conductors. In embodiments, this housing is made from LCP or MID technologies. The housing also includes a Fresnel lens that collimates the light from LED. Fresnel lens is manufactured by either injection molding or from a foil type of replicated type of plastic, where the foil is laminated on active lens. In embodiments, the foil is only part that varies among structures in case there is need to tune the optics for new LED. The foil type of Fresnel lens may be much thinner than injection molded lens.

Moreover, the housing may include leads enabling a SMD or pads for socket connection. In embodiments, the leads are injection molded. The LED light source may be located on a PWB surrounded by SMD pads or a socket for housing. In the case of a full module, the LED light source on the PWB is glued or soldered to housing. An electrical connection to the active lens can be made through conductive glue or solder within the housing. The Fresnel lens can be laminated on supporting wafer/panel of active lens.

Typically, an active lens is a cheap component and includes glass wafer support. Thus, the active lens can be used to deposit a roll made Fresnel lens onto the supporting glass wafer. This foil type of Fresnel lens can be easily changed with small customization expenses when there is new project and new LED with different radiation characteristics. Another benefit is that this is only one varying part of the structure, thus very reusable and modular structure is produced. The structure and foil type lens is also very robust for assembly tolerances, and provides unique feature over conventional Fresnel lens structures made by injection molding. Moreover, the present techniques are suitable for an SMT or connector type of assembly.

Example 1 is an apparatus for LED zoom. The apparatus includes an LED light source; a collimation lens to collimate light from the LED light source; and an active lens to adjust the collimated light from the collimation lens, wherein the collimation lens is bonded onto the active lens.

Example 2 includes the apparatus of example 1, including or excluding optional features. In this example, the collimation lens is a Fresnel lens.

Example 3 includes the apparatus of any one of examples 1 to 2, including or excluding optional features. In this example, the active lens comprises: a silicon wafer or liquid crystal panel; a front substrate, wherein the front substrate is made of glass or plastic; a rear substrate, wherein the rear substrate is made of glass or plastic and is bonded with the front substrate. Optionally, the collimation lens is directly molded, replicated, laminated, or printed onto the rear substrate.

Example 4 includes the apparatus of any one of examples 1 to 3, including or excluding optional features. In this example, the active lens is a microelectromechanical (MEMS) lens or a liquid crystal (LC) lens.

Example 5 includes the apparatus of any one of examples 1 to 4, including or excluding optional features. In this example, the active lens is formed from a silicon wafer bonded with a glass wafer, and the collimation lens is fully foil laminated as a portion of a wafer prior to singulation.

Example 6 includes the apparatus of any one of examples 1 to 5, including or excluding optional features. In this example, the active lens is formed from a silicon wafer bonded with a glass wafer, and the collimation lens is foil laminated after singulation. Optionally, a light bending structure of the foil is about 10 um deep.

Example 7 includes the apparatus of any one of examples 1 to 6, including or excluding optional features. In this example, the LED light source, collimation lens, and active lens are electrically coupled with a housing, and the housing is socketable.

Example 8 includes the apparatus of any one of examples 1 to 7, including or excluding optional features. In this example, the LED light source, collimation lens, and active lens are electrically coupled with a housing, and the housing is comprises surface mount technology to electrically couple with a printed circuit board. Optionally, the housing is a molded interconnect device housing. Optionally, housing is constructed via a laser direct structuring (LDS).

Example 9 includes the apparatus of any one of examples 1 to 8, including or excluding optional features. In this example, the collimation lens is separately injection molded and assembled within a housing.

Example 10 is an system for LED zoom. The system includes a computing device, wherein the computing device is communicative coupled to a housing, the housing including: an LED light source; a collimation lens to collimate light from the LED light source; and an active lens to adjust the collimated light from the collimation lens.

Example 11 includes the system of example 10, including or excluding optional features. In this example, the collimation lens is a Fresnel lens.

Example 12 includes the system of any one of examples 10 to 11, including or excluding optional features. In this example, the active lens comprises: a silicon wafer or liquid crystal panel; a front substrate, wherein the front substrate is made of glass or plastic; a rear substrate, wherein the rear substrate is made of glass or plastic and is bonded with the front substrate.

Example 13 includes the system of any one of examples 10 to 12, including or excluding optional features. In this example, the collimation lens is directly molded, replicated, laminated, or printed onto the rear substrate.

Example 14 includes the system of any one of examples 10 to 13, including or excluding optional features. In this example, the active lens is a microelectromechanical (MEMS) lens or a liquid crystal (LC) lens.

Example 15 includes the system of any one of examples 10 to 14, including or excluding optional features. In this example, the active lens is formed from a silicon wafer bonded with a glass wafer, and the collimation lens is fully foil laminated as a portion of a wafer prior to singulation.

Example 16 includes the system of any one of examples 10 to 15, including or excluding optional features. In this example, the active lens is formed from a silicon wafer bonded with a glass wafer, and the collimation lens is foil laminated after singulation.

Example 17 includes the system of any one of examples 10 to 16, including or excluding optional features. In this example, the housing is a molded interconnect device housing.

Example 18 includes the system of any one of examples 10 to 17, including or excluding optional features. In this example, the housing is constructed via a laser direct structuring (LDS).

Example 19 includes the system of any one of examples 10 to 18, including or excluding optional features. In this example, the collimation lens is separately injection molded and assembled within a housing.

Example 20 is a method for implementing an LED zoom structure. The method includes bonding a collimated lens onto a substrate, wherein the substrate is a portion of an active lens; placing the bonded lens into a housing, wherein the housing is electrically coupled with the bonded lens.

Example 21 includes the method of example 20, including or excluding optional features. In this example, the housing is electrically coupled with a circuit board via surface mount technology, a socket, or via a module type configuration.

Example 22 includes the method of any one of examples 20 to 21, including or excluding optional features. In this example, the collimation lens is a Fresnel lens.

Example 23 includes the method of any one of examples 20 to 22, including or excluding optional features. In this example, the collimated lens is molded, replicated, laminated, or printed onto the substrate.

Example 24 includes the method of any one of examples 20 to 23, including or excluding optional features. In this example, the active lens is a microelectromechanical (MEMS) lens or a liquid crystal (LC) lens.

Example 25 includes the method of any one of examples 20 to 24, including or excluding optional features. In this example, the active lens is formed from a silicon wafer bonded with a glass wafer, and the collimation lens is fully foil laminated as a portion of a wafer prior to singulation.

Example 26 includes the method of any one of examples 20 to 25, including or excluding optional features. In this example, the active lens is formed from a silicon wafer bonded with a glass wafer, and the collimation lens is foil laminated after singulation.

Example 27 includes the method of any one of examples 20 to 26, including or excluding optional features. In this example, the LED light source, collimation lens, and active lens are electrically coupled with a housing, and the housing is socketable.

Example 28 includes the method of any one of examples 20 to 27, including or excluding optional features. In this example, the LED light source, collimation lens, and active lens are electrically coupled with a housing, and the housing is comprises surface mount technology to electrically couple with a printed circuit board.

Example 29 includes the method of any one of examples 20 to 28, including or excluding optional features. In this example, the housing is a molded interconnect device housing.

Example 30 includes the method of any one of examples 20 to 29, including or excluding optional features. In this example, the collimation lens is separately injection molded and assembled within a housing.

Example 31 is an apparatus for LED zoom. The apparatus includes an LED light source; a collimation lens to collimate light from the LED light source; and an active lens to adjust the collimated light from the collimation lens, wherein the collimation lens is bonded onto the active lens.

Example 32 includes the apparatus of example 31, including or excluding optional features. In this example, the collimation lens is a Fresnel lens.

Example 33 includes the apparatus of any one of examples 31 to 32, including or excluding optional features. In this example, the active lens comprises: a silicon wafer or liquid crystal panel; a front substrate, wherein the front substrate is made of glass or plastic; a rear substrate, wherein the rear substrate is made of glass or plastic and is bonded with the front substrate. Optionally, the collimation lens is directly molded, replicated, laminated, or printed onto the rear substrate.

Example 34 includes the apparatus of any one of examples 31 to 33, including or excluding optional features. In this example, the active lens is a microelectromechanical (MEMS) lens or a liquid crystal (LC) lens.

Example 35 includes the apparatus of any one of examples 31 to 34, including or excluding optional features. In this example, the active lens is formed from a silicon wafer bonded with a glass wafer, and the collimation lens is fully foil laminated as a portion of a wafer prior to singulation.

Example 36 includes the apparatus of any one of examples 31 to 35, including or excluding optional features. In this example, the active lens is formed from a silicon wafer bonded with a glass wafer, and the collimation lens is foil laminated after singulation. Optionally, a light bending structure of the foil is about 10 um deep.

Example 37 includes the apparatus of any one of examples 31 to 36, including or excluding optional features. In this example, the LED light source, collimation lens, and active lens are electrically coupled with a housing, and the housing is socketable.

Example 38 includes the apparatus of any one of examples 31 to 37, including or excluding optional features. In this example, the LED light source, collimation lens, and active lens are electrically coupled with a housing, and the housing is comprises surface mount technology to electrically couple with a printed circuit board. Optionally, the housing is a molded interconnect device housing. Optionally, housing is constructed via a laser direct structuring (LDS).

Example 39 includes the apparatus of any one of examples 31 to 38, including or excluding optional features. In this example, the collimation lens is separately injection molded and assembled within a housing.

In the foregoing description, numerous specific details have been set forth, such as examples of specific types of system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
  a light source;
  a collimation lens to at least partially collimate light from the light source to enable a large zoom factor; and
  an active lens to adjust light from the collimation lens, wherein the active lens is an adaptive lens that is to direct the at least partially collimated light at an angle into a resultant light beam.

2. The apparatus of claim 1, wherein the collimation lens is a Fresnel lens.

3. The apparatus of claim 1, wherein the active lens comprises:
  a silicon wafer or liquid crystal panel;
  a front substrate, wherein the front substrate is made of glass or plastic;
  a rear substrate, wherein the rear substrate is made of glass or plastic and is bonded with the front substrate.

4. The apparatus of claim 3, wherein the collimation lens is directly molded, replicated, laminated, or printed onto the rear substrate.

5. The apparatus of claim 1, wherein the active lens is to increase a range of the light from the light source.

6. The apparatus of claim 1, wherein the active lens is a microelectromechanical (MEMS) lens or a liquid crystal (LC) lens.

7. The apparatus of claim 1, wherein the active lens is formed from a silicon wafer bonded with a glass wafer, and the collimation lens is fully foil laminated as a portion of a wafer prior to singulation.

8. The apparatus of claim 1, wherein the active lens is formed from a silicon wafer bonded with a glass wafer, and the collimation lens is foil laminated after singulation.

9. The apparatus of claim 1, wherein the collimation lens is foil laminated and a light bending structure of the foil is about 10 um deep.

10. The apparatus of claim 1, wherein the light source, collimation lens, and active lens are electrically coupled with a housing, and the housing is socketable.

11. The apparatus of claim 1, wherein the light source, collimation lens, and active lens are electrically coupled with a housing, and the housing is comprises surface mount technology to electrically couple with a printed circuit board.

12. The apparatus of claim 1, wherein the light source, collimation lens, and active lens are electrically coupled with a housing, and the housing is a molded interconnect device housing.

13. The apparatus of claim 1, wherein the light source, collimation lens, and active lens are electrically coupled with a housing, and housing is constructed via a laser direct structuring (LDS).

14. The apparatus of claim 1, wherein the collimation lens is separately injection molded and assembled within a housing.

15. A system, comprising:
a computing device, wherein the computing device is communicatively coupled to a housing, the housing including:
a light source;
a collimation lens to at least partially collimate light from the light source; and
an active lens to enable a lighting mode via the collimated light from the collimation lens.

16. The system of claim 15, wherein the collimation lens is a Fresnel lens.

17. The system of claim 15, wherein the active lens comprises:
a silicon wafer or liquid crystal panel;
a front substrate, wherein the front substrate is made of glass or plastic;
a rear substrate, wherein the rear substrate is made of glass or plastic and is bonded with the front substrate.

18. The system of claim 15, wherein the collimation lens is directly molded, replicated, laminated, or printed onto the rear substrate.

* * * * *